United States Patent
Nakaoka et al.

(10) Patent No.: US 11,388,335 B2
(45) Date of Patent: Jul. 12, 2022

(54) IMAGE PROCESSING APPARATUS AND CONTROL METHOD THEREOF IN WHICH A CONTROL CIRCUIT OUTPUTS A SELECTED IMAGE SIGNAL VIA AN EXTERNAL DEVICE TO A SIGNAL PROCESSING CIRCUIT

(71) Applicant: CANON KABUSHIKI KAISHA, Tokyo (JP)

(72) Inventors: Hiroshi Nakaoka, Kawaguchi (JP); Yohei Horikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 17/009,939

(22) Filed: Sep. 2, 2020

(65) Prior Publication Data
US 2021/0075960 A1 Mar. 11, 2021

(30) Foreign Application Priority Data
Sep. 6, 2019 (JP) .............................. JP2019-163274

(51) Int. Cl.
*H04N 5/232* (2006.01)
*G06T 7/00* (2017.01)
*H04N 1/21* (2006.01)

(52) U.S. Cl.
CPC ....... *H04N 5/23229* (2013.01); *G06T 7/0002* (2013.01); *H04N 1/2112* (2013.01); *G06T 2207/30168* (2013.01); *H04N 2201/0084* (2013.01)

(58) Field of Classification Search
CPC ............. H04N 5/23229; H04N 1/2112; H04N 2201/0084; G06T 7/0002; G06T 2207/30168
See application file for complete search history.

(56) References Cited

U.S. PATENT DOCUMENTS

| 9,967,451 | B2 | 5/2018 | Takahashi et al. | |
| 2012/0051630 | A1* | 3/2012 | Sato | H04N 5/2355 382/162 |
| 2018/0054566 | A1* | 2/2018 | Yaguchi | H04N 5/37455 |
| 2019/0104308 | A1* | 4/2019 | Nishida | H04N 19/147 |
| 2021/0250497 | A1* | 8/2021 | Shoda | H04N 5/232945 |

FOREIGN PATENT DOCUMENTS

JP 2017-153156 A 8/2017

* cited by examiner

*Primary Examiner* — Gevell V Selby
(74) *Attorney, Agent, or Firm* — Venable LLP

(57) ABSTRACT

An image processing apparatus includes a first signal processing circuit that receives image signals from an image sensor and a second signal processing circuit that performs image processing on image signals output from the first signal processing circuit. The first signal processing circuit includes an evaluation circuit that determines evaluation values for image signals, a control circuit that controls an order according to which the image signals are output to the second signal processing circuit, based on the evaluation values, and a selection circuit that selects an image signal for a single frame from among the image signals for a predetermined plural number of frames, based on the evaluation values.

14 Claims, 8 Drawing Sheets

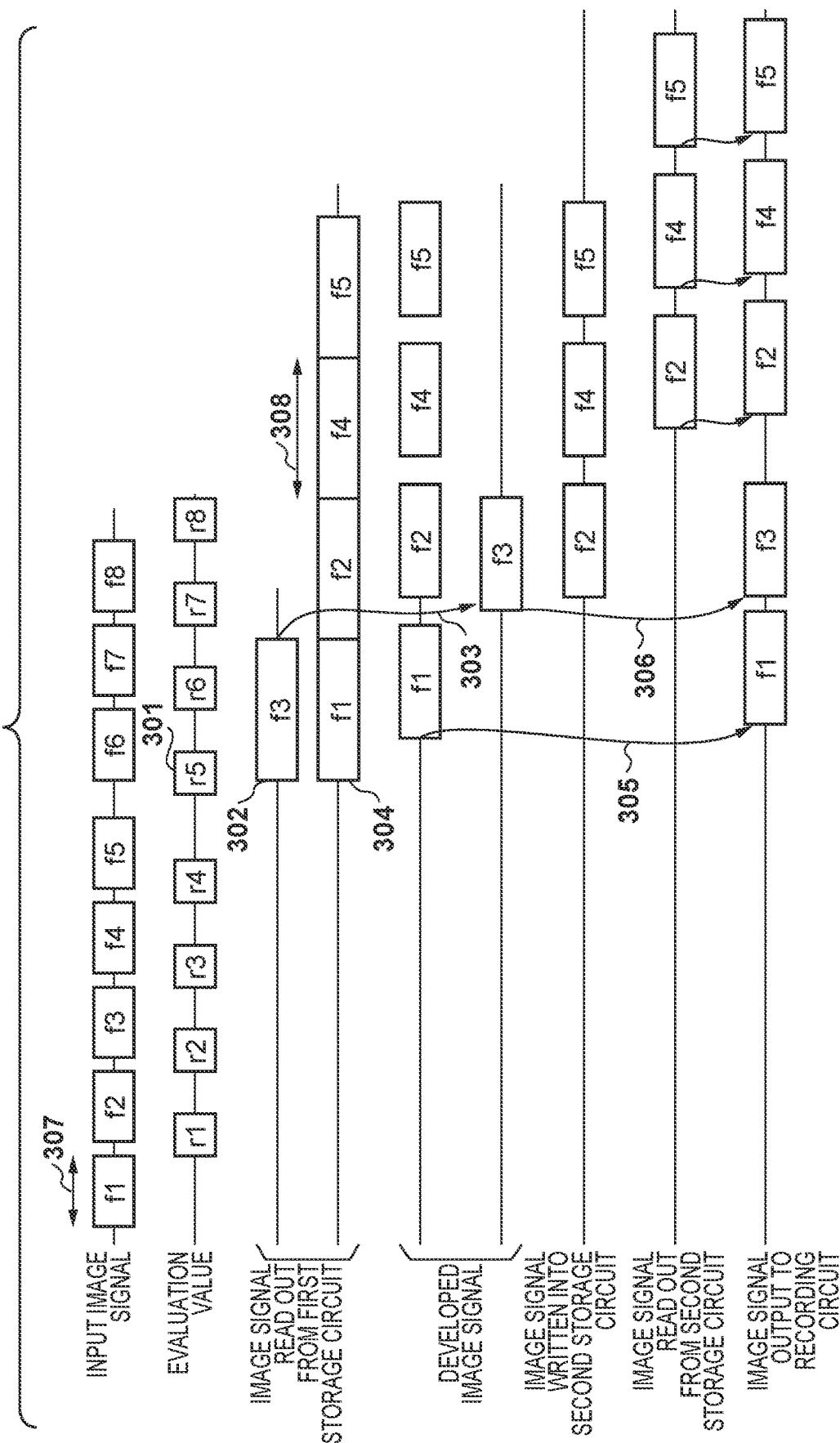

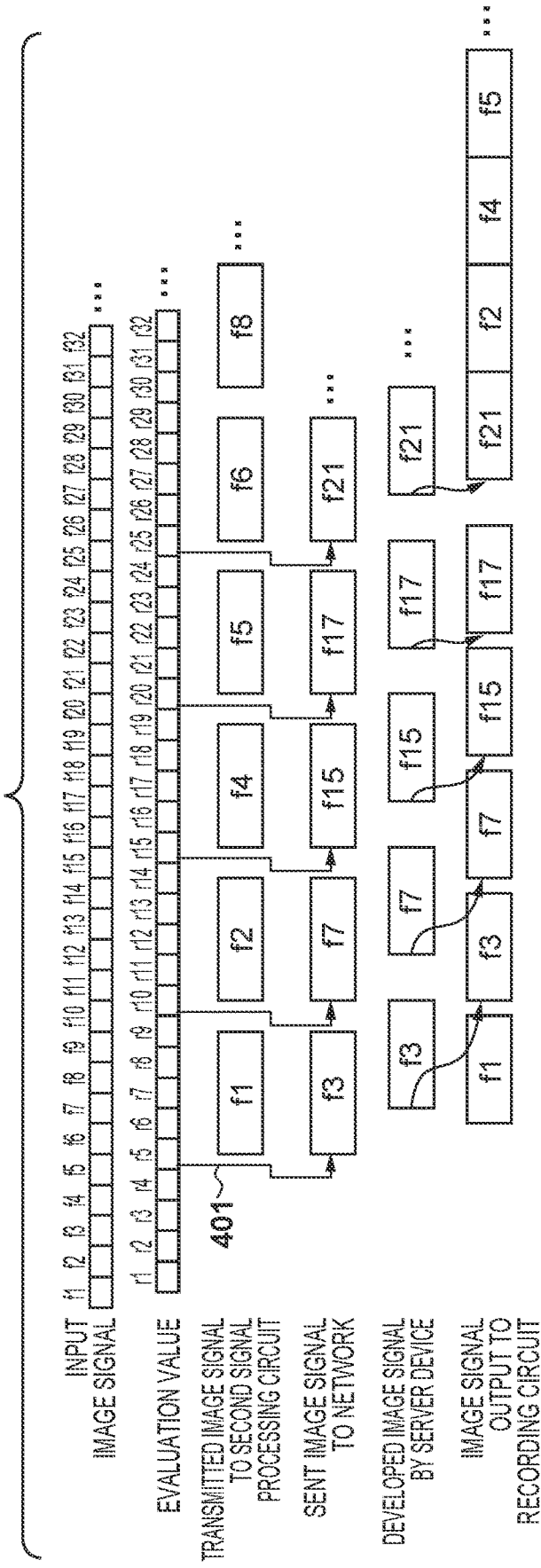
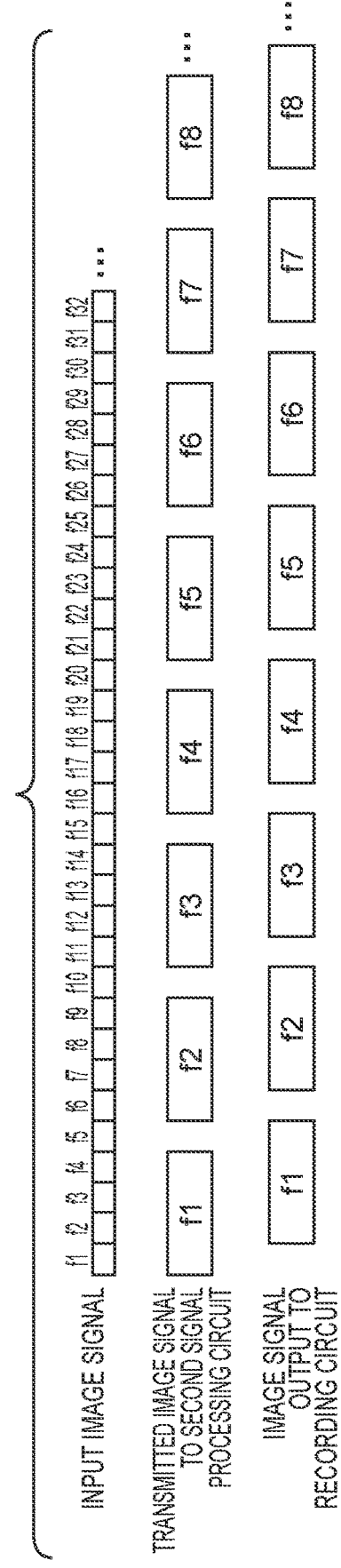

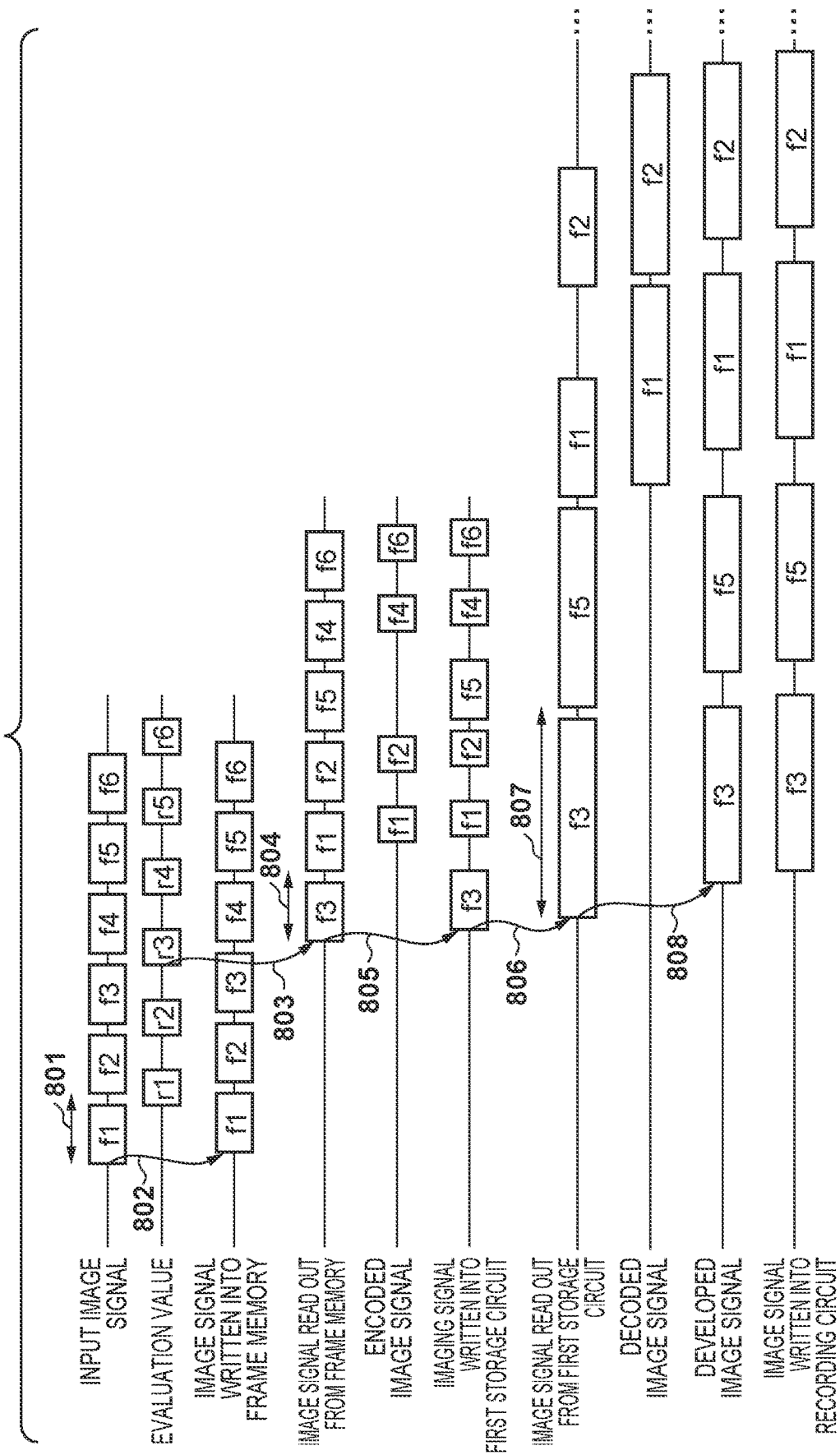

IMAGE PROCESSING APPARATUS AND CONTROL METHOD THEREOF IN WHICH A CONTROL CIRCUIT OUTPUTS A SELECTED IMAGE SIGNAL VIA AN EXTERNAL DEVICE TO A SIGNAL PROCESSING CIRCUIT

CROSS-REFERENCE TO RELATED APPLICATIONS

This application claims the benefit of Japanese Patent Application No. 2019-163274 filed Sep. 6, 2019, which is hereby incorporated by reference herein in its entirety.

BACKGROUND OF THE INVENTION

Field of the Invention

The present invention relates to an image processing apparatus and a method of controlling the image processing apparatus, particularly, to an image processing apparatus that is suitable for image processing performed in an image capture apparatus and a method of controlling the image processing apparatus.

Description of the Related Art

Heretofore, an image capture apparatus is known that includes two image processing circuits connected in series and suppresses an increase in the data rate at which data is supplied from a prior-stage image processing circuit to a subsequent-stage image processing circuit by changing processing performed in the prior-stage image processing circuit according to an output data rate of an image sensor (Japanese Patent Laid-Open No. 2017-153156).

With the configuration described in Japanese Patent Laid-Open No. 2017-153156, if the output data rate of the image sensor is high, image signals are accumulated in a memory that is connected to the prior-stage image processing circuit and then read out at a data rate according to a processing capacity of the subsequent-stage image processing circuit. Therefore, there is a problem in that, if a large number of frames are accumulated in the memory, a time lag from image capturing to supply to the subsequent-stage image processing circuit is increased, and, consequently, the time it takes from image capturing to completion of recording is increased.

Japanese Patent Laid-Open No. 2017-153156 also describes a configuration in which an image is compressed in the prior-stage image processing circuit to be accumulated in the memory and decompressed to be transmitted to the subsequent-stage image processing circuit. As a result of the image being compressed to be accumulated in the memory, the number of frames that can be accumulated in the memory can be increased, but there is a risk that the quality of the image may be degraded due to the compression.

SUMMARY OF THE INVENTION

The present invention was made in view of the above-described problems of conventional technologies. The present invention realizes in an aspect at least any of a reduction in the time it takes from image capturing to completion of recording and suppression of degradation of the image quality due to encoding in an image processing apparatus that includes two image processing devices and a method of controlling the image processing apparatus.

According to an aspect the present invention provides an image processing apparatus comprising a first signal processing circuit that receives image signals from an image sensor and a second signal processing circuit that performs image processing on image signals output from the first signal processing circuit, wherein the first signal processing circuit includes an evaluation circuit that determines evaluation values for image signals, and a control circuit that controls an order according to which the image signals are output to the second signal processing circuit, based on the evaluation values.

According to another aspect the present invention provides an image capture apparatus comprising an image sensor and an image processing apparatus that processes image signals output from the image sensor, wherein the image processing apparatus comprises a first signal processing circuit that receives image signals from the image sensor and a second signal processing circuit that performs image processing on image signals output from the first signal processing circuit, wherein the first signal processing circuit includes an evaluation circuit that determines evaluation values for image signals, and a control circuit that controls an order according to which the image signals are output to the second signal processing circuit, based on the evaluation values.

According to a further aspect the present invention provides a method of controlling an image processing apparatus including a first signal processing circuit that receives image signals from an image sensor and a second signal processing circuit that performs image processing on image signals that have been output from the first signal processing circuit, the method comprising determining, by the first signal processing circuit, evaluation values for image signals, and controlling, by the first signal processing circuit, an order according to which the image signals are output to the second signal processing circuit, based on the evaluation values.

According to another aspect, the present invention, provides a non-transitory medium storing instructions executable by one or more processors, wherein the instructions, when executed by the one or more processors, cause the one or more processors to function as an image processing apparatus that comprises a first signal processing unit configured to receive image signals from an image sensor and a second signal processing unit configured to perform image processing on image signals output from the first signal processing unit, wherein the first signal processing unit includes an evaluation unit configured to determine evaluation values for image signals, and a control unit configured to control an order according to which the image signals are output to the second signal processing unit, based on the evaluation values.

Further features of the present invention will become apparent from the following description of exemplary embodiments (with reference to the attached drawings).

BRIEF DESCRIPTION OF THE DRAWINGS

FIG. 3A is a timing chart showing an example of operation of the image processing apparatus according to the first embodiment.

FIGS. 3B and 3C are timing charts for showing effects of the first embodiment.

FIG. 6 is a timing chart showing an example of operation of the image processing apparatus according to the second embodiment.

DESCRIPTION OF THE EMBODIMENTS

Figure 1:
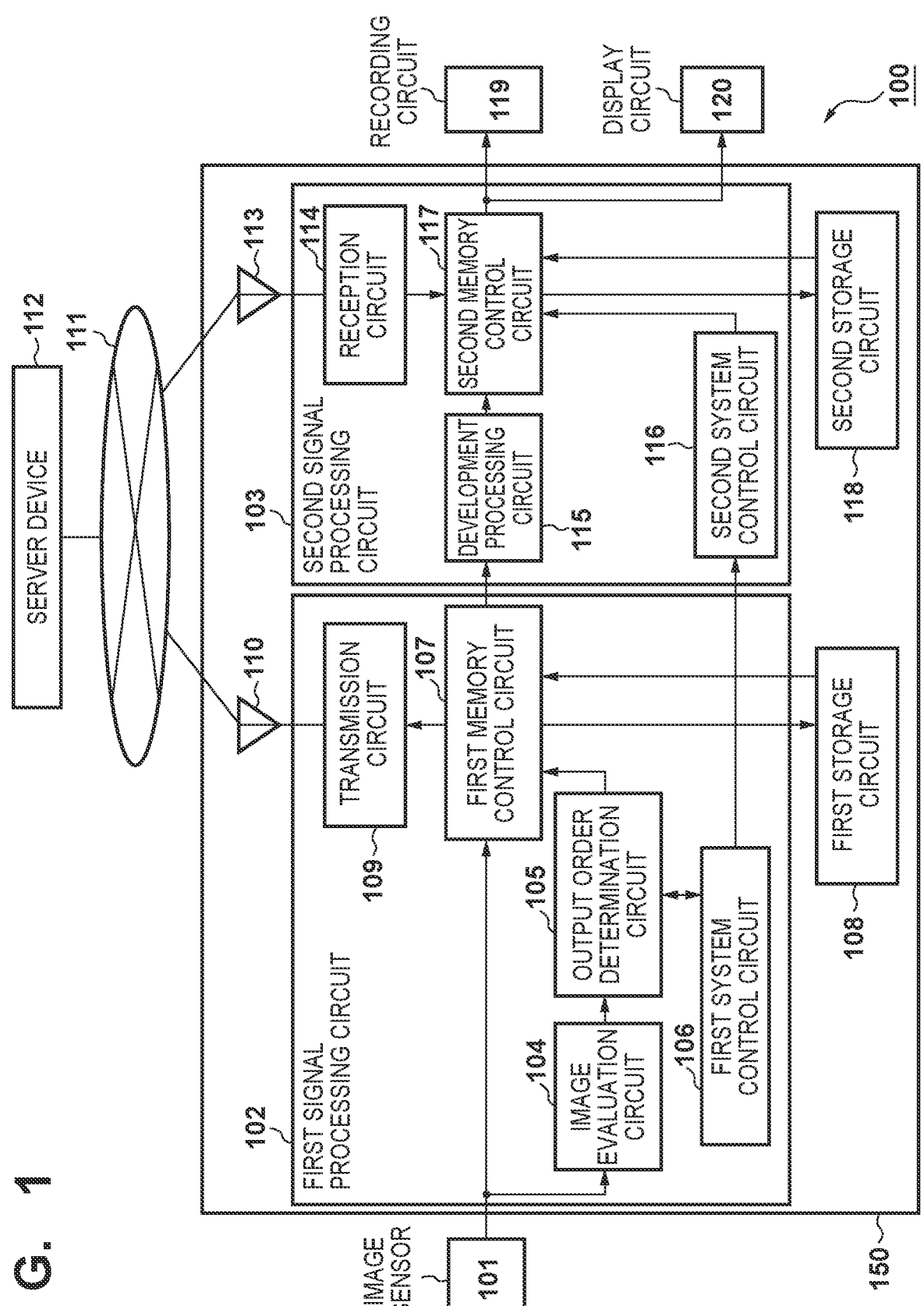
FIG. 1 is a block diagram showing an example of a functional configuration of an image capture apparatus in which an image processing apparatus according to a first embodiment is used.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

First Embodiment

FIG. 1 is a functional block diagram of an image capture apparatus 100 in which an image processing apparatus 150 according to a first embodiment of the present invention is used. Here, the description is focused on processing of image data that is output from an image sensor, and therefore descriptions of constitutional elements that do not directly relate to image processing are omitted to facilitate the description and understanding of the invention. However, actually, the image capture apparatus 100 includes configurations, such as a lens, a diaphragm, a shutter, an operation unit, and a power supply unit, that are commonly included in image capture apparatuses.

Note that a case in which the present invention is implemented in an image capture apparatus such as a digital camera will be described in the following embodiments. However, the present invention is applicable to any electronic device that includes an image capturing function. Examples of such electronic devices include a video camera, a computer device (a personal computer, a tablet computer, a media player, a PDA, etc.), a mobile phone, a smartphone, a game machine, a robot, a drone, and a drive recorder. These are examples and the present invention is also applicable to other electronic devices.

An image sensor 101 includes a plurality of pixels that are photoelectric conversion elements, and converts an optical image formed by an imaging lens into a pixel signal group (image signal) using the pixels. The image sensor 101 may be a CMOS (Complementary Metal Oxide Semiconductor) image sensor, for example. The image sensor 101 outputs image signals to the image processing apparatus 150. Image capturing operation of the image sensor 101, focus adjustment of the imaging lens, and so on, are controlled by a control circuit of the image capture apparatus 100 by using known methods.

The image processing apparatus 150 includes a first signal processing circuit 102 and a second signal processing circuit 103 that are connected in series. The first signal processing circuit 102 performs signal processing on image signals that have been output from the image sensor 101 and supplies the image signals to the second signal processing circuit. The second signal processing circuit 103 processes data supplied from the first signal processing circuit 102 disposed at the prior stage. A first storage circuit (memory) 108 is connected to the first signal processing circuit 102 and a second storage circuit (memory) 118 is connected to the second signal processing circuit 103. The first signal processing circuit 102 and the second signal processing circuit 103 may be configured as separate integrated circuits (ICs, LSIs, etc.), for example. In this case, the first signal processing circuit 102 and the second signal processing circuit 103 may have separate packages or may be mounted in the same package.

In the first signal processing circuit 102, an image evaluation circuit 104 computes an evaluation value that is prescribed in advance regarding each image signal output from the image sensor 101. The image evaluation circuit 104 can compute evaluation values of one or more types regarding a portion (e.g., a focus detection region, a center portion of an image, a feature region (e.g., a face region), a region set by a user, etc.) or the entirety of an image that is indicated by the image signal, for example. Note that the image evaluation circuit 104 may also compute the evaluation value after reducing the resolution of the image signal as necessary.

The evaluation value is used as a measure for evaluating the quality of the image indicated by the image signal from one or more perspectives of exposure, a focusing degree, and the state of a main subject. For example, in a case in which evaluation is performed in terms of the focusing degree, a contrast evaluation value that is used for auto focusing or the amount of high-frequency components included in the image signal can be computed, for example. Also, in a case in which evaluation is performed in terms of exposure, at least one of an average luminance, the maximum luminance, and the minimum luminance of the entire image or a specific region of the image can be computed as the evaluation value, for example. Also, evaluation values of one or more types regarding exposure and the focusing degree of a focus detection region, a region specified by the user, or a region detected as a feature region can be computed as the state of a main subject. If the main subject is a feature region such as a face region, facial expressions and states (whether or not one is smiling, closing the eyes, facing to the front, etc.) may also be computed as evaluation values.

Which evaluation value is to be computed can be determined in advance or dynamically based on one or more conditions such as the data rate of the image signal output from the image sensor 101, the capacity of the image evaluation circuit 104, and the data rate of the image signal supplied to the second signal processing circuit 103. The first signal processing circuit 102 may output the computed evaluation value as-is or output an evaluation result (whether or not the image is favorable) based on the evaluation value.

In a case in which evaluation results are determined based on evaluation values, a table in which evaluation results are associated with evaluation values and/or combinations of evaluation values can be used. An evaluation value may also be used as-is as an evaluation result, depending on the evaluation value. For example, evaluation values and evaluation results can be associated with each other such that a more favorable evaluation result is given if the exposure (luminance value) is appropriate, the focusing degree is high, or the main subject is in a desirable state (smiling, not closing the eyes, facing to the front, etc.).

An output order determination circuit 105 determines an order in which image signals stored in the first storage circuit 108 are read out, based on evaluation values or evaluation results obtained from the image evaluation circuit 104 and control information obtained from a first system control circuit 106, which will be described later. More specifically, the output order determination circuit 105 selects an image signal that is to be preferentially output, and determines the order in which the image signals are read out, based on the selection result. The output order determination circuit 105 outputs output order information that indicates the determined order to a first memory control circuit 107 and the first system control circuit 106. Operation of the output order determination circuit 105 is controlled by the first system control circuit 106. Details of the operation of the output order determination circuit 105 will be described later.

The first system control circuit 106 controls operation of the first signal processing circuit 102. The first system control circuit 106 includes a processor and a memory, for example, and controls operation of each block of the first signal processing circuit 102 as a result of the processor executing a program stored in the memory. As a portion of operation of the first system control circuit 106, the first system control circuit 106 transmits control information to the output order determination circuit 105 and transmits information (capturing order information) regarding capturing order of image signals to the second signal processing circuit 103.

The first memory control circuit 107 stores image signals that have been read out from the image sensor 101 into the first storage circuit 108 and reads out image signals that have been stored in the first storage circuit 108 to supply the image signals to a transmission circuit 109 or the second signal processing circuit 103. Operation of the first memory control circuit 107 is controlled by the first system control circuit 106.

The first storage circuit 108 is a buffer memory for temporarily storing image signals that have been read out from the image sensor 101, and includes a storage element, a representative example of which is a DRAM (Dynamic Random Access Memory). The first storage circuit 108 has a capacity that is large enough to store uncompressed image signals of about ten frames, for example.

The transmission circuit 109 is a network interface for transmitting image signals read out from the first memory control circuit 107 to an external server device 112 via a network 111. The network 111 may be the Internet, for example. Here, the transmission circuit 109 is a wireless communication interface and communicates with the server device 112 via a transmission antenna 110. Note that settings that are necessary for the image capture apparatus 100 to communicate with the server device 112 via the transmission circuit 109 are performed in advance. Note that, in practice, the transmission circuit 109 included in the first signal processing circuit 102 and a reception circuit 114 included in the second signal processing circuit 103 may also be realized by a single communication circuit that can transmit and receive data. In this case, the first signal processing circuit 102 and the second signal processing circuit 103 communicate with the server device 112 via the common communication circuit.

Next, a configuration of the second signal processing circuit 103 will be described.

The reception circuit 114 is a wireless communication interface and receives data such as image signals from the server device 112 via a reception antenna 113. Note that the transmission circuit 109 and the reception circuit 114 may also be wired communication interfaces. Also, in practice, the transmission antenna 110 and the reception antenna 113 may also be constituted by the same antenna. The reception circuit 114 supplies received image signals to a second memory control circuit 117.

A development processing circuit 115 applies predetermined development processing that includes signal format conversion from the RGB format to the YUV format, white balance adjustment, color interpolation, gamma correction, and so on, to image signals (RAW image data) supplied from the first signal processing circuit 102. Note that "development processing" is a generic term of a plurality of types of processing performed to convert image data of a RAW format that is unique to a manufacturer to image data of a universal format such as the bit map format, the PNG format, or the JPEG format. Details of specific processing that is applied as the development processing may vary according to settings of the image capture apparatus, a hardware configuration, and so on. Also, the development processing circuit 115 may apply other image processing such as processing for generating an evaluation value that is used for automatic exposure control (AE) or automatic focus detection (AF), on image data before or after the development.

Image signals to which the development processing has been applied are output from the development processing circuit 115 to the second memory control circuit 117 and finally recorded in a recording circuit 119 or displayed in a display circuit 120.

A second system control circuit 116 controls operation of the second signal processing circuit 103. The second system control circuit 116 includes a processor and a memory, for example, and controls operation of each block of the second signal processing circuit 103 as a result of the processor executing a program stored in the memory. As a portion of operation of the second system control circuit 116, the second system control circuit 116 receives the capturing order information from the first system control circuit 106 and transmits the capturing order information to the second memory control circuit 117.

The second memory control circuit 117 stores image signals that have been output from the first signal processing circuit 102 and image signals that have been received from the server device 112 into the second storage circuit 118 or transmits the image signals to the recording circuit 119 or the display circuit 120. Also, the second memory control circuit 117 reads out image signals that have been stored in the second storage circuit 118 and transmits the image signals to the recording circuit 119 or the display circuit 120.

The second storage circuit 118 is a buffer memory for temporarily storing image signals supplied from the first signal processing circuit 102 and the server device 112, and includes a storage element, a representative example of which is a DRAM (Dynamic Random Access Memory).

The recording circuit 119 is a storage apparatus such as a hard disk drive or an SSD, or a memory card and a reader-writer of the memory card, and records and reads out data.

The display circuit 120 includes a display device such as a liquid crystal display and a driver circuit of the display device, and performs display based on image signals that have been read out from the second memory control circuit 117. Note that the display circuit 120 may also include a function of converting supplied image signals into image signals that are suitable for display in the display device.

The first signal processing circuit 102 can supply image signals to the second signal processing circuit 103 at a data rate that is lower than the output data rate of the image sensor 101, as necessary. Therefore, the image processing apparatus 150 can be easily applied to image sensors having various output data rates.

Figure 2:
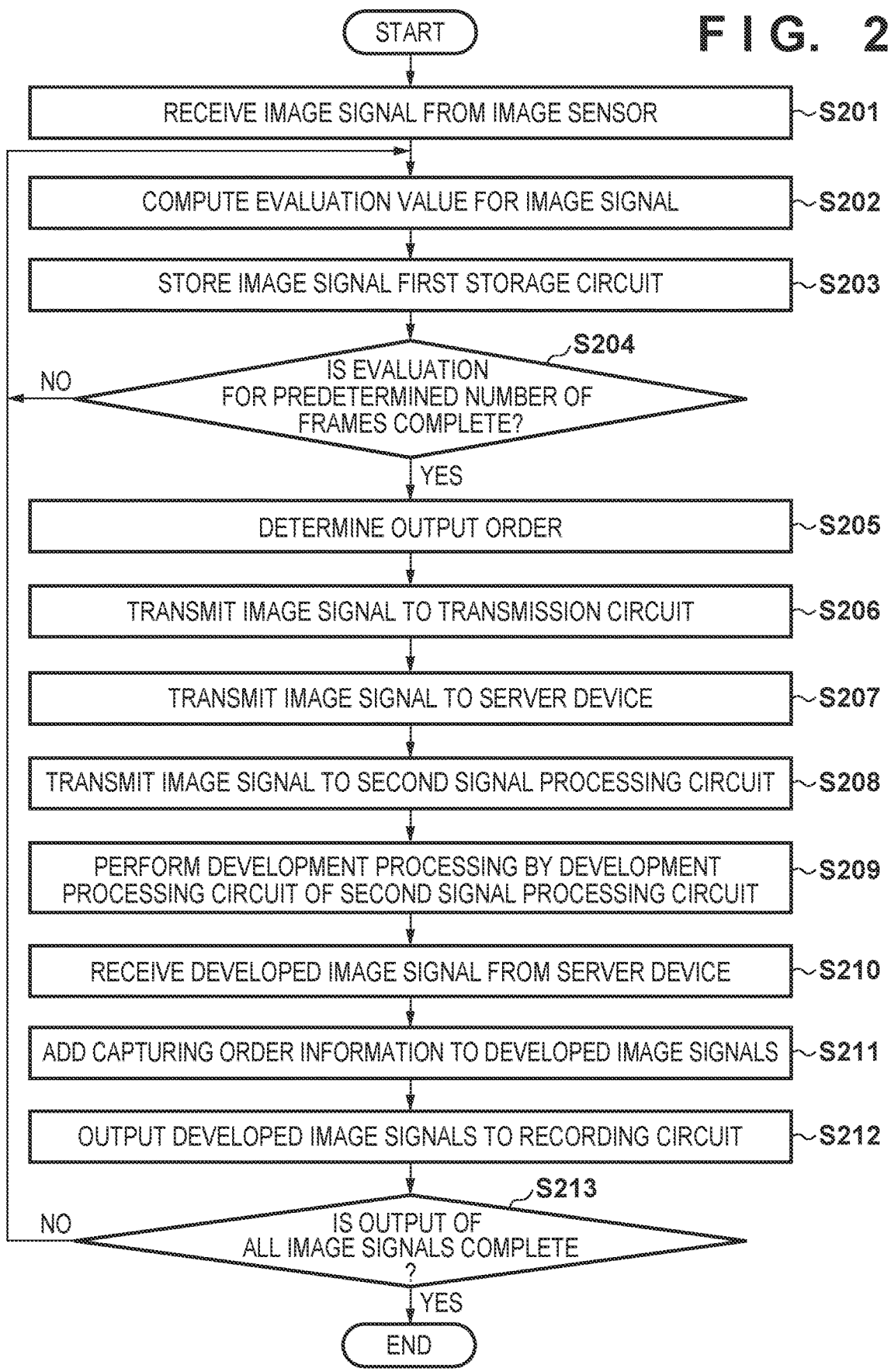
FIG. 2 is a flowchart regarding operation of the image processing apparatus according to the first embodiment.

Next, operation of the image processing apparatus 150 will be described with reference to the flowchart shown in FIG. 2. Here, it is assumed that image signals are successively given from the image sensor 101 to the image processing apparatus 150 as in the case of continuous shooting of still images or moving image shooting.

Step S201: The first signal processing circuit 102 starts to receive an image signal of a single frame from the image sensor 101.

Step S202: The image evaluation circuit 104 computes an evaluation value for the received image signal. Here, it is assumed that a contrast evaluation value is computed as the evaluation value. The contrast evaluation value may be similar to an evaluation value that is used for contrast detection AF. If the focusing degree of an image is high, the contrast evaluation value of the image is high, and if the focusing degree of an image is low, the contrast evaluation value of the image is low. Here, the evaluation value is computed with respect to an image signal from a focus detection region to evaluate whether or not the focusing degree is high with respect to a subject that is intended by the user in an image that is based on the received image signal. The image evaluation circuit outputs the computed contrast evaluation value to the output order determination circuit 105.

Step S203: The first memory control circuit 107 stores the image signal that has been received from the image sensor 101 into the first storage circuit 108. Note that, in practice, steps S202 and S203 may be executed in parallel.

Step S204: The first system control circuit 106 determines whether or not storing into the first storage circuit 108 and computation of evaluation values performed by the image evaluation circuit 104 have been complete with respect to image signals of a predetermined number of frames. Upon determining that the storing and the computation have been complete, the first system control circuit 106 advances the processing to step S205, and otherwise returns the processing to step S202. The predetermined number of frames for which the determination is made in this step is determined in advance in view of the capacity of the first storage circuit 108, the output data rate of the image sensor 101, a processing data rate of the second signal processing circuit 103, and so on. Note that the predetermined number of frames needs to be a number of frames that can be stored in the first storage circuit 108. Here, the predetermined number of frames is five, which is one example. Note that the first system control circuit 106 also advances the processing to step S205 in a case in which the processing cannot be performed for the predetermined number of frames, such as a case in which image capturing has ended.

Step S205: The output order determination circuit 105 determines an order in which the image signals of the predetermined number of frames stored in the first storage circuit 108 are read out, based on evaluation values output from the image evaluation circuit 104. Thus, in the present embodiment, the order in which image signals of a plurality of frames stored in the first storage circuit 108 are read out is controlled according to results of evaluation performed by the image evaluation circuit 104. Accordingly, image signals may be supplied to the second signal processing circuit 103 in an order different from the order in which the image signals have been output from the image sensor 101. More specifically, an image signal that is rated highly by the image evaluation circuit 104 is preferentially read out from the first storage circuit 108 to preferentially process an image that has high quality or matches the intention of the user, among a plurality of frame images. As a result, the time it takes from image capturing to completion of recording or display can be reduced with respect to the image that has high quality or matches the intention of the user.

FIG. 3A is a timing chart showing operation of the image processing apparatus 150. Image signals f1 to f8 of eight frames are sequentially output from the image sensor 101. Values r1 to r8 represent evaluation values computed by the image evaluation circuit 104 with respect to the image signals f1 to f8. In the present embodiment, an output order is determined every time accumulation in the first storage circuit 108 and computation of evaluation values performed by the image evaluation circuit 104 are complete with respect to image signals of five frames, which is one example.

At a timing 301 at which the evaluation value r5 regarding the image signal of the fifth frame is output, the output order determination circuit 105 determines an image signal that is rated the highest of the image signals f1 to f5 as an image signal that is to be read out first, based on the evaluation values r1 to r5. Here, evaluation values are contrast evaluation values, and, therefore, the output order determination circuit 105 determines an image signal (f3) that has the highest evaluation value as the image signal to be read out first (image signal to be transmitted to the server device 112). In this example, the remaining image signals are output in the order in which the image signals have been output from the image sensor 101. The output order determination circuit 105 outputs output order information that indicates the determined order f3, f1, f2, f4, f5 to the first memory control circuit 107 and the first system control circuit 106.

Step S206: The first memory control circuit 107 reads out the image signals from the first storage circuit 108 in accordance with the output order information obtained from the output order determination circuit 105. The first memory control circuit 107 reads the image signal of the frame that is described first in the output order information from the first storage circuit 108 and outputs the image signal to the transmission circuit 109. This is shown by a timing 302 in FIG. 3A. When reading of the image signal from the first storage circuit 108 is started, the first system control circuit 106 transmits the output order information to the second system control circuit 116. The second system control circuit 116 outputs the received output order information to the second memory control circuit 117.

Step S207: The transmission circuit 109 transmits the image signal f3 supplied from the first memory control circuit 107 to the server device 112 on the network 111 via the transmission antenna 110. Similar to the development processing circuit 115, the server device 112 applies development processing to the received image signal. Note that the development processing applied by the server device 112 may also be image processing that imposes a higher processing load and imparts higher quality than the development processing applied by the development processing circuit 115. As described above, the first signal processing circuit 102 in the present embodiment outputs the image signal having the highest evaluation value via the server device 112, which is an external device, to the second signal processing circuit 103.

Step S208: The first memory control circuit 107 reads out image signals other than the image signal transmitted to the transmission circuit 109 in step S206, from the first storage circuit 108 in accordance with the output order information determined by the output order determination circuit 105, and outputs the image signals to the development processing circuit 115. That is, the first signal processing circuit 102 in the present embodiment outputs image signals other than the image signal having the highest evaluation value to the second signal processing circuit 103 not via the server device 112, which is the external device. The first memory control circuit 107 reads out the image signals f1, f2, f4, and f5 remaining in the first storage circuit 108 in the order of the frames, and outputs the image signals to the development processing circuit 115. In FIG. 3A, output is started at a timing 304. Note that, in the flowchart shown in FIG. 2, the remaining image signals are transmitted in step S208 after the image signal f3 is transmitted in step S206, but output to the transmission circuit 109, and output to the development processing circuit 115 may also be performed in parallel as shown in FIG. 3A.

Note that 307 and 308 in FIG. 3A indicate periods that are necessary to process an image signal of a single frame in the first signal processing circuit 102 and the second signal processing circuit 103, respectively. In the present embodiment, the first signal processing circuit 102 is configured to process an image signal of a single frame at a higher speed than the second signal processing circuit 103 to be able to deal with even a situation in which the data rate of the image sensor 101 is high.

Note that, in the first signal processing circuit 102, storing into the first storage circuit 108 and computation of evaluation values performed by the image evaluation circuit 104 are executed in parallel with respect to an image signal f6 and subsequent image signals while the processing from step S205 to step S208 is performed with respect to the image signals of the predetermined number of frames. Processing in step S209 and the following steps is performed in the second signal processing circuit 103.

Step S209: The development processing circuit 115 sequentially applies the development processing to the image signals f1, f2, f4, and f5 and outputs the image signals subjected to the development processing to the second memory control circuit 117.

Step S210: After completing the development processing of the image signal f3, the server device 112 transmits the image signal subjected to the development processing to the image capture apparatus 100. This image signal is received by the reception circuit 114 via the reception antenna 113 in step S210. FIG. 3A shows that, at a timing 303, the reception circuit 114 of the image capture apparatus 100 starts to receive the image signal f3 subjected to the development processing. Note that the flowchart shows that the image signal is received from the server device 112 after step S209, for the sake of convenience, but in practice, the development processing performed by the development processing circuit 115 and reception of the image signal f3 from the server device 112 may be executed in parallel as shown in FIG. 3A. The reception circuit 114 outputs the image signal f3 to the second memory control circuit 117.

Step S211: The second memory control circuit 117 adds, to the image signals that are supplied from the development processing circuit 115 and the reception circuit 114, capturing order information based on the output order information supplied from the second system control circuit 116. Here, the second memory control circuit 117 adds the frame number (in this example, 3) that is described first in the output order information to the image signal supplied from the reception circuit 114. Also, the second memory control circuit 117 sequentially adds the second and subsequent frame numbers (in this example, 1, 2, 4, and 5) described in the output order information to the image signals supplied from the development processing circuit 115.

As a result of the capturing order information that indicates the order in which the image signals have been output from the image sensor 101 being added to the image signals f1 to f5, the image signals can be rearranged into the capturing order in the recording circuit 119 even if the image signals f1 to f5 are recorded in the recording circuit 119 in an order different from the capturing order. Note that, in this example, the capturing order information is added to the image signals in the second signal processing circuit 103. However, a configuration is also possible in which the first memory control circuit 107 adds the capturing order information, for example, as attribute information to the image signals when the image signals are read out from the first storage circuit 108 based on the output order information.

Step S212: The second memory control circuit 117 outputs the image signals subjected to the development processing to the recording circuit 119 in the order in which the image signals have been supplied. In FIG. 3A, the development processing is completed first with respect to the image signal f1 out of the image signals f1 to f5, and supply of the image signal f1 from the development processing circuit 115 to the second memory control circuit 117 is started at a timing 305. The second memory control circuit 117 immediately outputs the image signal f1 to the recording circuit 119 since no image signal is being output to the recording circuit 119. The recording circuit records the image signal f1 in a recording apparatus or a recording medium.

Before the development processing of the image signal f2 is completed, the reception circuit 114 starts to receive the image signal f3, and the image signal f3 is supplied to the second memory control circuit 117 from the timing 303. In response to this, the second memory control circuit 117 starts to output the image signal f3 to the recording circuit 119. While the image signal f3 is being output, the development processing of the image signal f2 is completed and supply of the image signal f2 from the development processing circuit 115 to the second memory control circuit 117 is started. The second memory control circuit 117 stores the image signal f2 in the second storage circuit 118. Thereafter, when output of the image signal f3 is finished, the second memory control circuit 117 reads out the image signal f2 from the second storage circuit 118 and starts to output the image signal f2 to the recording circuit 119. Thereafter, the image signals f4 and f5 are sequentially output to the recording circuit 119 after temporarily stored in the second storage circuit 118.

Note that, if the reception circuit 114 starts to receive the image signal f3 from the server device 112 while an image signal supplied from the development processing circuit 115 is being output, the second memory control circuit 117 may cause the image signal f3 to be preferentially recorded, if possible. Specifically, if it is possible to interrupt recording of an image signal and add a remaining portion of the image signal later in the recording circuit 119, the second memory control circuit may output the image signal f3 to the recording circuit 119 while storing the remaining portion of the image signal that is being recorded, in the second storage circuit 118. Thereafter, when recording of the image signal f3 is finished, the remaining portion of the image signal read out from the second storage circuit 118 is output to the recording circuit 119 and added to the image signal that has been partially recorded.

Alternatively, a configuration is also possible in which image signals supplied from the development processing circuit 115 are stored in the second storage circuit 118 while being output to the recording circuit 119, until reception of an image signal from the reception circuit 114 is started. When reception of an image signal from the reception circuit 114 is started, the second memory control circuit 117 terminates output of an image signal that is being recorded, and outputs the image signal received from the reception circuit 114 to the recording circuit 119. Then, after output of the image signal received from the reception circuit 114 is complete, the second memory control circuit 117 again reads out the image signal from the second storage circuit 118 and outputs the image signal from the beginning.

Step S213: After outputting the image signals of the predetermined number of frames to the recording circuit 119, the second system control circuit 116 notifies the first system control circuit 106 of this fact. The first system control circuit 106 determines whether or not output to the recording circuit 119 has been complete with respect to all image signals that have been received by the image processing apparatus 150 from the image sensor 101. Upon determining that the output has been complete, the first system control circuit 106 ends the processing, and otherwise executes the processing in step S202 and the following steps with respect to image signals that have not been processed.

Note that, although a configuration in which image signals are output from the image processing apparatus 150 to the recording circuit 119 has been described, a configuration is also possible in which image signals are output to the recording circuit 119 and the display circuit 120.

Note that a configuration in which the image processing apparatus 150 can communicate with the external server device 112 has been described in the present embodiment. However, the use of the server device 112 is not essential in the present invention. If the server device 112 is not used, the first memory control circuit 107 outputs all image signals to the development processing circuit 115 in accordance with the output order information. In this case as well, an image signal that is rated highly is preferentially processed, and the time it takes for the image signal to be recorded or displayed can be reduced.

Effects realized with the present embodiment will be described using FIG. 3B. Image signals output from the image sensor 101 are evaluated in units of five frames to determine image signals to be preferentially processed. At a timing 401, the image signal f3 having the highest evaluation value r3 of the evaluation values r1 to r5 is determined as an image signal to be preferentially processed, and is transmitted to the network 111. Thereafter, image signals f7, f15, f17, and f21 are determined as image signals to be preferentially processed, and are sequentially transmitted to the network 111. Image signals that have been developed in the server device 112 can be preferentially processed such that the image signals are output to the recording circuit or the display circuit as soon as possible upon being received.

If the method according to the present embodiment is not used, image signals are output from the first signal processing circuit 102 to the second signal processing circuit 103 in the order in which the image signals are stored in the first storage circuit 108. In this case, recording and display are performed in the capturing order as shown in FIG. 3C, and, therefore, uniform delays are generated and the convenience may be reduced.

According to the present embodiment, in the image processing apparatus 150 including the first signal processing circuit 102 and the second signal processing circuit 103, the first signal processing circuit 102 is used as a buffer circuit for adapting the output data rate of the image sensor to the processing data rate of the second signal processing circuit 103. Therefore, the image processing apparatus 150 can support image sensors having various output rates. Furthermore, images are evaluated in the first signal processing circuit 102, and out of image signals of a plurality of frames that are accumulated, an image signal that is rated highly is preferentially output from the first signal processing circuit 102. Therefore, the highly rated image signal is preferentially processed in the second signal processing circuit 103 and the time it takes from image capturing to completion of recording or display can be reduced. Furthermore, if the highly rated image signal is processed by the external server device, it is possible to apply processing that imparts higher quality than processing performed in the second signal processing circuit 103 or to complete the processing in a shorter period.

Second Embodiment

Next, a second embodiment of the present invention will be described. In the first embodiment, the first signal processing circuit 102 does not reduce the data volume (compress image signals) when storing image signals in the first storage circuit 108. In the present embodiment, the data volume of image signals that are stored in the first storage circuit 108 is adaptively reduced based on evaluation results of images to efficiently use the first storage circuit 108 while suppressing degradation of the image quality.

Figure 4:
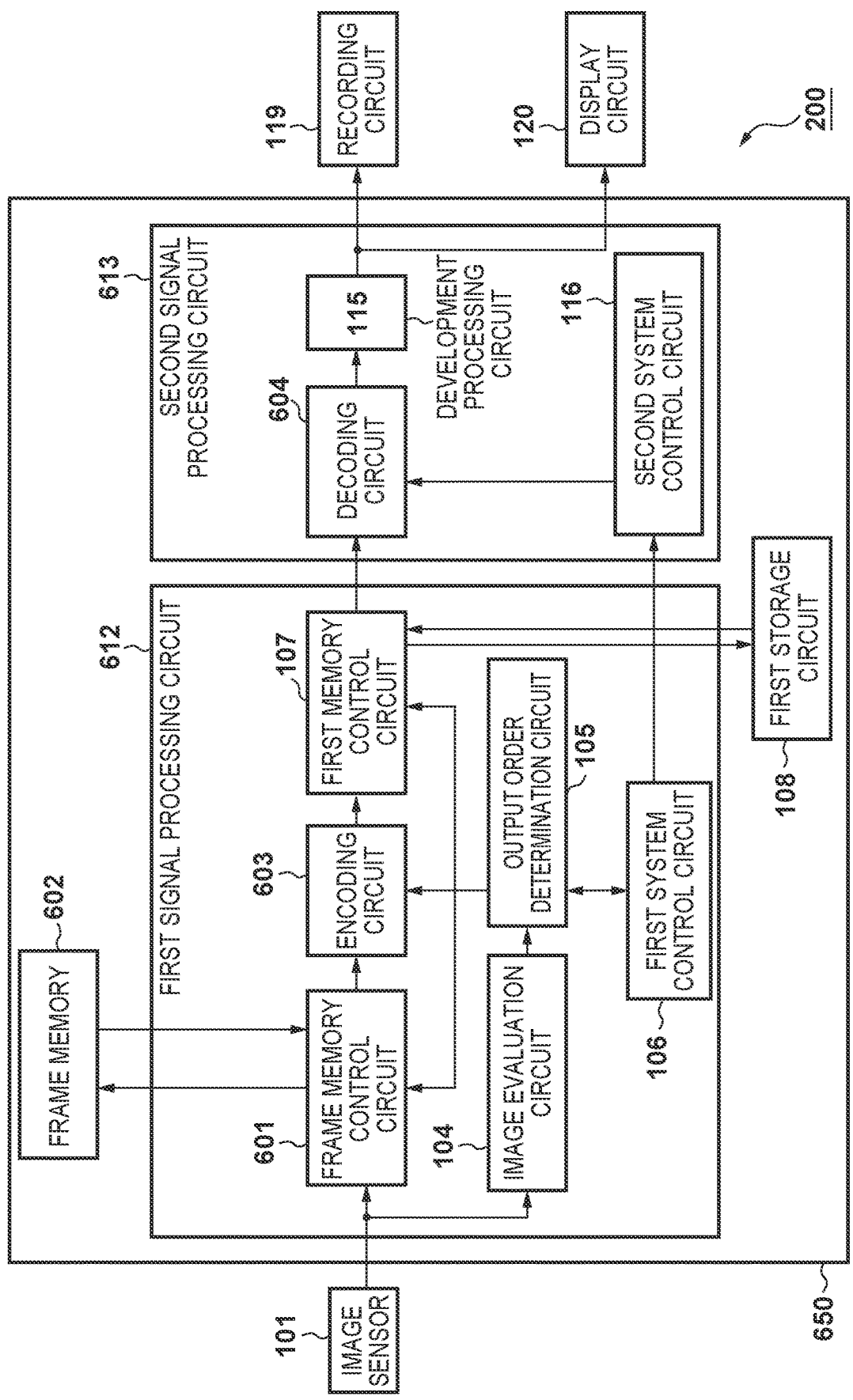
FIG. 4 is a block diagram showing an example of a functional configuration of an image capture apparatus in which an image processing apparatus according to a second embodiment is used.

FIG. 4 is a functional block diagram of an image capture apparatus 200 in which an image processing apparatus 650 according to the second embodiment of the present invention is used. Configurations similar to those in the image capture apparatus 100 described in the first embodiment are denoted with the same reference numerals as those used in FIG. 1, and descriptions thereof are omitted.

In FIG. 4, the image processing apparatus 650 according to the present embodiment does not include a configuration relating to communication with an external server device, but the image processing apparatus 650 may also include such a configuration. A first signal processing circuit 612 includes a frame memory control circuit 601 and an encoding circuit 603 at stages prior to (on the image sensor 101 side of) the first memory control circuit 107.

The frame memory control circuit 601 controls writing (storing) of image signals into a frame memory 602 and reading of image signals from the frame memory 602. The frame memory control circuit 601 stores image signals that have been output from the image sensor 101 into the frame memory 602, and reads out image signals that have been stored in the frame memory 602 to output the image signals to the encoding circuit 603.

The frame memory 602 is a memory for storing image signals of a predetermined number of frames that have been output from the image sensor 101, and includes a storage element, a representative example of which is a DRAM.

The encoding circuit 603 encodes image signals that are selected based on output order information from among the image signals of the frames stored in the frame memory 602 to reduce the data volume. The encoding circuit 603 encodes the image signals by using a lossy encoding method to efficiently reduce the data volume. The encoding circuit 603 outputs the encoded image signals to the first memory control circuit 107. The encoding circuit 603 outputs image signals that are not selected to the first memory control circuit 107 without encoding those image signals.

A second signal processing circuit 613 includes a decoding circuit 604 at a stage prior to the development processing circuit 115. The decoding circuit 604 decodes the encoded image signals among image signals that are supplied from the first signal processing circuit 102, and outputs the decoded image signals to the development processing circuit 115. The decoding circuit 604 can identify image signals that are to be decoded (or not to be decoded) based on the output order information supplied from the second system control circuit 116. The encoding circuit 603 included in the first signal processing circuit 612 and the decoding circuit 604 included in the second signal processing circuit 613 support the same encoding method. Note that the decoding circuit 604 outputs image signals that have not been encoded, without applying decoding processing to the image signals.

In the present embodiment as well, the first signal processing circuit 612 absorbs a difference between the output data rate of the image sensor 101 and the processing data rate of the second signal processing circuit 613 by making a data rate at which data is read out from the first storage circuit 108 lower than a data rate at which data is written into the first storage circuit 108. On the other hand, a data rate at which data is read out from the frame memory 602 may be set to be equal to or higher than a data rate at which data is written into the frame memory 602.

Figure 5:
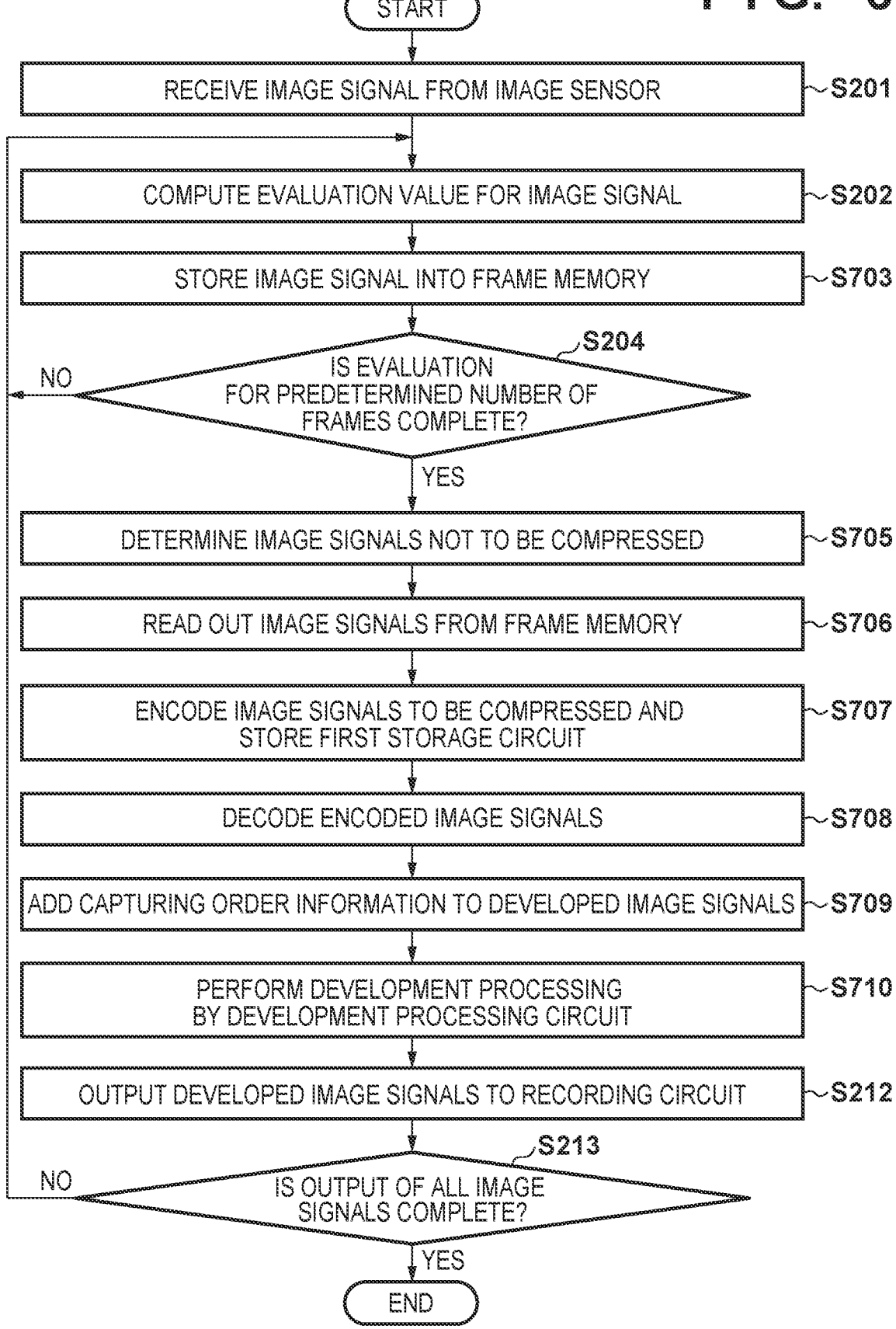
FIG. 5 is a flowchart regarding operation of the image processing apparatus according to the second embodiment.

Next, operation of the image processing apparatus 650 will be described with reference to the flowchart shown in FIG. 5. Similar to the first embodiment, it is assumed that image signals are successively given from the image sensor 101 to the image processing apparatus 650. Steps in which the same operations as those performed in the first embodiment are performed are denoted with the same reference numerals as those used in FIG. 2, and descriptions thereof are omitted.

Step S703: The frame memory control circuit 601 sequentially stores image signals that have been output from the image sensor 101 into the frame memory 602. Here, it is assumed that image signals of successive three frames are stored in the frame memory 602.

FIG. 6 is a timing chart showing operation of the image processing apparatus 650. Image signals f1 to f6 of six frames are sequentially output from the image sensor 101. Here, 801 indicates a period for which an image signal of a single frame is input. Values r1 to r6 represent evaluation values computed by the image evaluation circuit 104 with respect to the image signals f1 to f6. The frame memory control circuit 601 starts to write image signals into the frame memory 602 at a timing 802. In the present embodiment, image signals to be encoded are determined every time accumulation in the frame memory 602 and computation of evaluation values performed by the image evaluation circuit 104 are complete with respect to image signals of three frames, which is one example.

In step S204, if it is determined by the first system control circuit 106 that storing into the frame memory 602 and computation of evaluation values performed by the image evaluation circuit 104 have been complete with respect to image signals of three frames, the processing proceeds to step S705. Note that the first system control circuit 106 also advances the processing to step S705 in a case in which the processing cannot be performed for the predetermined number of frames, such as a case in which image capturing has ended.

Step S705: The output order determination circuit 105 determines an image signal that is not to be encoded, with respect to the image signals of three frames stored in the frame memory 602, based on evaluation values output from the image evaluation circuit 104. Here, the output order determination circuit 105 determines an image signal that is rated the highest by the image evaluation circuit 104 as the image signal not to be encoded. In the example shown in FIG. 6, the image signal f3 is determined as the image signal not to be encoded.

The output order determination circuit 105 generates output order information in which the image signal not to be encoded is described as the image signal that is output first to the second signal processing circuit 103 out of the image signals of three frames. Then, the output order determination circuit 105 outputs the output order information to the frame memory control circuit 601, the encoding circuit 603, the first memory control circuit 107, and the first system control circuit 106. Out of the image signals of three frames stored in the frame memory 602, image signals of two frames that are to be encoded are described in the order in which the frames have been captured, in the output order information. Note that, in this example, the encoding circuit 603 recognizes the image signal that is described first in the output order information as the image signal not to be encoded, but a configuration is also possible in which information for identifying the image signal not to be encoded is output to the encoding circuit 603.

Step S706: The frame memory control circuit 601 reads out the image signals from the frame memory 602 in the order in accordance with the output order information. In FIG. 6, the image signal f3 is read out from the frame memory 602 from a timing 803 at which the evaluation result r3 is output from the image evaluation circuit 104 and the output order determination circuit 105 outputs the output order information. Note that a period 804 for which an image signal of a single frame is read out from the frame memory 602 is equivalent to the period 801 for which an image signal of a single frame is written from the image sensor 101 into the frame memory 602.

Step S707: The encoding circuit 603 encodes image signals based on the output order information and outputs the image signals to the first memory control circuit 107. The first memory control circuit 107 sequentially stores the image signals that have been output from the encoding circuit 603 in the first storage circuit 108. Note that the image signal f3 that is read out first from the frame memory 602 is input to the encoding circuit 603, but the encoding circuit 603 does not encode the image signal f3 based on the output order information, and outputs the image signal f3 as-is to the first memory control circuit 107.

In the example shown in FIG. 6, the first memory control circuit 107 stores the image signal f3 in the first storage circuit 108 at a timing 805. Then, at a timing 806, the first memory control circuit 107 reads out the image signal f3 from the first storage circuit 108 and starts to output the image signal f3 to the second signal processing circuit 103.

Since the output data rate of the image sensor 101 is higher than the processing data rate of the second signal processing circuit 103, data is read out from the first storage circuit 108 at a rate that is lower than a rate at which data is written into the first storage circuit 108. Therefore, in FIG. 6, a period 807 for which an image signal of a single frame is read out from the first storage circuit 108 is longer than the period 804 for which an image signal of a single frame is read out from the frame memory. FIG. 6 shows a case in which the output data rate of the image sensor 101 is three times as high as the processing data rate of the second signal processing circuit 103. The number of frames of image signals stored in the frame memory is determined by taking the ratio between the output data rate of the image sensor 101 and the processing data rate of the second signal processing circuit 103 into consideration.

Out of the image signals f1 to f3 of the first three frames, the image signals f1 and f2 are encoded by the encoding circuit 603 and output to the first memory control circuit 107. The first memory control circuit 107 reads out image signals from the first storage circuit 108 and outputs the image signals to the second signal processing circuit 103, in accordance with the output order information.

Note that, in the example shown in FIG. 6, output order information regarding image signals f4 to f6 of the next three frames stored in the frame memory is generated before the first memory control circuit 107 finishes outputting the image signal f3 to the second signal processing circuit 103. Therefore, after finishing outputting the image signal f3 to the second signal processing circuit 103, the first memory control circuit 107 preferentially outputs, to the second signal processing circuit 103, the image signal f5 that is not encoded and of which writing into the first storage circuit 108 has been started by that point in time. In such a case in which image signals are output to the second signal processing circuit 103 in order different from the output order information, the first memory control circuit 107 notifies the first system control circuit 106 of actual output order information (f3, f5, f1, f2, f4, f6). Then, the first system control circuit 106 transmits the output order information given from the first memory control circuit 107 to the second system control circuit 116. However, a configuration is also possible in which control of the output order is fixed in units of three frames, and the image signal f5 is output to the second signal processing circuit 103 after the image signals f1 and f2 are output to the second signal processing circuit 103.

Processing in step S708 and the following steps is performed in the second signal processing circuit 103.

Step S708: The decoding circuit 604 decodes encoded image signals among a plurality of image signals that have been output from the first signal processing circuit 102. The decoding circuit 604 can identify image signals that are not to be decoded, based on the output order information supplied from the second system control circuit 116. Specifically, the decoding circuit 604 takes, as the image signals not to be decoded, image signals of frames the number of which is one third of the total number of items and that are described first in the output order information. Accordingly, if output order information in which f1 to f6 are described is supplied, the decoding circuit 604 does not apply decoding processing to image signals of the first two frames.

Step S709: The decoding circuit 604 adds capturing order information to the image signals supplied from the first signal processing circuit 102, based on the output order information supplied from the second system control circuit 116. In the example shown in FIG. 6, the output order information (f3, f5, f1, f2, f4, f6) is supplied, and, therefore, the decoding circuit 604 sequentially adds frame numbers according to the output order information to the image signals of the first six frames. Note that a configuration is also possible in which the first memory control circuit 107 adds the capturing order information, for example, as attribute information to the image signals when the image signals are read out from the first storage circuit 108.

Step S710: The development processing circuit 115 sequentially applies the development processing to the image signals that have been output from the decoding circuit 604. Details of the development processing may be similar to those in the first embodiment.

Subsequent processing is similar to that performed in the first embodiment, and, therefore, a description of which is omitted.

Figure 7A:
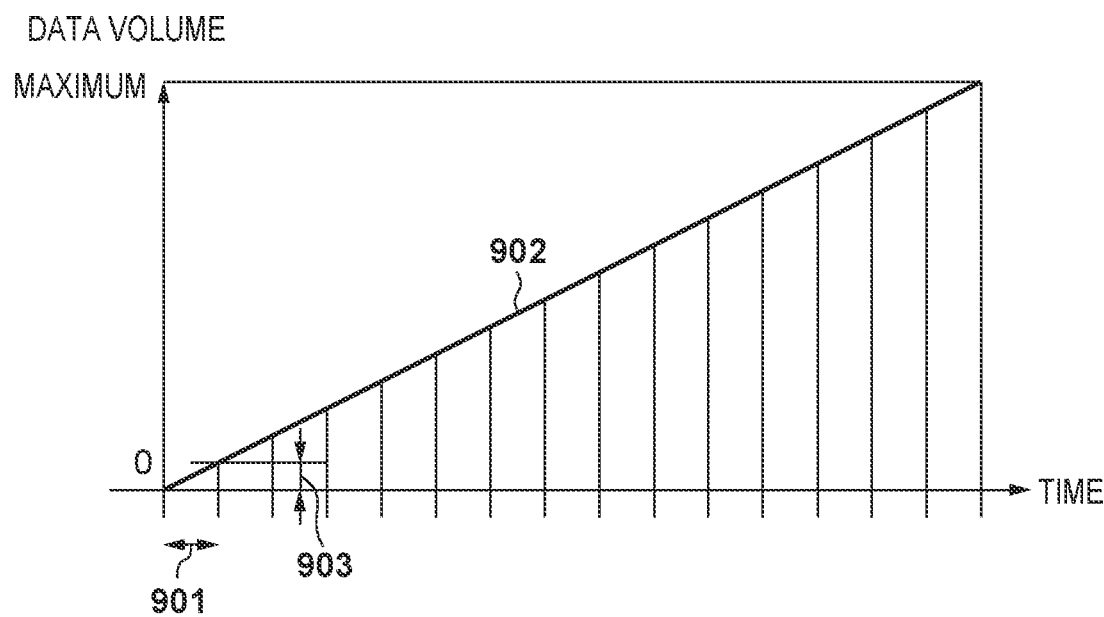
FIGS. 7A and 7B are diagrams for showing effects of the second embodiment.

Effects realized with the present embodiment will be described using FIGS. 7A and 7B. FIG. 7A shows a state in which image signals output from the image sensor 101 are accumulated in the first storage circuit 108 in the present embodiment. Here, 901 indicates the period that it takes for an image signal of a single frame to be stored. Also, 903 indicates the data volume of an encoded image signal of a single frame in a case in which the data volume is reduced by 50% through encoding performed by the encoding circuit 603. Here, it is assumed that the data volume is equal between image signals of respective frames for the sake of convenience. Further, 902 shows temporal change in the data volume when image signals are continuously accumulated in the first storage circuit 108.

In the present embodiment, image signals that are not encoded are substantially not accumulated in the first storage circuit 108 (this is because the signals are stored for data rate adjustment but reading of the signals is immediately started). Therefore, it is possible to consider that substantially, only encoded image signals are accumulated in the first storage circuit 108. Therefore, image signals of a larger number of frames can be stored in the first storage circuit 108, and this contributes to improvement in the continuous shooting speed, or the like.

Figure 7B:
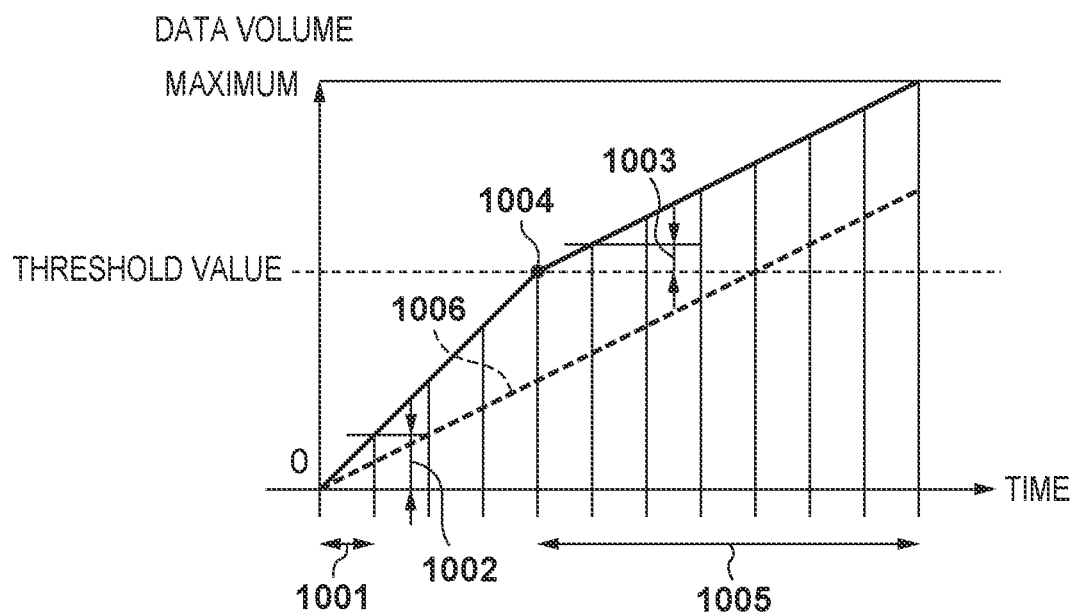

On the other hand, if encoding is not performed and image signals are output from the first signal processing circuit 612 to the second signal processing circuit 613 in the capturing order, temporal change in the volume of data accumulated in the first storage circuit 108 is as shown in FIG. 7B. Similar to 901 in FIG. 7A, 1001 indicates the period that it takes for an image signal of a single frame to be stored. Also, 1002 indicates the data volume of an image signal of a single frame. Since encoding is not performed, the data volume per frame is large, and the number of frames that can be stored in the first storage circuit 108 is reduced.

If the volume of data stored in the first storage circuit 108 has exceeded a threshold value 1004, it is possible to consider encoding subsequent image signals to reduce the data volume per frame as shown by 1003 and to elongate a period until the volume of accumulated data reaches the maximum volume of data that can be stored. However, if this method is employed, image signals that are stored during a period 1005 after the data volume has exceeded the threshold value 1004 are uniformly encoded, and, accordingly, degradation of the image quality due to lossy encoding cannot be avoided.

According to the present embodiment, the data volume of the first storage circuit 108 is gradually increased as shown by 1006. Furthermore, image signals that are rated highly are not encoded, and, therefore, can be kept from the influence of degradation of the image quality due to lossy encoding. Furthermore, the development processing is preferentially performed on the highly rated image signals, and, therefore, the time it takes for recording or display can be reduced.

In the present embodiment, an image signal of a single frame that is rated the highest among image signals of a predetermined number of frames is not encoded, and the remaining image signals are encoded. However, a configuration is also possible in which all image signals are encoded, and the image signal that is rated the highest is encoded in such a manner that degradation of the image quality is suppressed when compared to the remaining image signals. In this case, the volume of data output to the second signal processing circuit 103 can be reduced with respect to the image signal that is rated the highest, and, therefore, the period 807 shown in FIG. 6 can be reduced. As a result, the number of frames included in a unit for which image evaluation is performed (the number of frames for which determination is performed in step S204) can be reduced depending on conditions. In this case, a larger number of image signals that are rated highly can be immediately recorded or displayed.

Although a configuration in which the frame memory 602 and the first storage circuit 108 are provided independently from each other is described in the present embodiment, a configuration is also possible in which a bus configuration is adopted in signal processing blocks and the frame memory 602 and the first storage circuit 108 are constituted by the same memory.

According to the present embodiment, in the image processing apparatus 650 including the first signal processing circuit 612 and the second signal processing circuit 613, the first signal processing circuit 612 is used as a buffer circuit for adapting the output data rate of the image sensor to the processing data rate of the second signal processing circuit 613. Therefore, the image processing apparatus 650 can support image sensors having various output rates. Furthermore, images are evaluated in the first signal processing circuit 102, and out of image signals of a plurality of frames that are accumulated, an image signal that is rated highly is encoded (or not encoded) such that degradation of the image quality is suppressed when compared to the remaining image signals. Therefore, it is possible to suppress degradation of the image quality due to encoding with respect to the highly rated image signal, while efficiently using the first storage circuit 108. Furthermore, the highly rated image signal is preferentially output from the first signal processing circuit 102, and, therefore, the image signal is preferentially processed in the second signal processing circuit 103 and the time it takes from image capturing to completion of recording or display can be reduced.

OTHER EMBODIMENTS

In the above-described embodiments, the first storage circuit 108, the second storage circuit 118, the frame memory 602, the transmission circuit 109, the reception circuit 114, the transmission antenna 110, and the reception antenna 113 are described as constitutional elements of the image processing apparatus. However, a configuration is also possible in which some or all of these do not constitute the image processing apparatus. The image processing apparatus is only required to include at least the first signal processing circuit and the second signal processing circuit.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or the apparatus by, for example, reading out and executing the computer executable instructions from the storage medium to perform the functions of one or more of the above-described embodiment(s) and/or controlling the one or more circuits to perform the functions of one or more of the above-described embodiment(s). The functions may include subroutines, modules, sub-programs, or units. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   (A) a first signal processing circuit that receives image signals from an image sensor; and
   (B) a second signal processing circuit that performs image processing on image signals output from the first signal processing circuit,
   wherein the first signal processing circuit includes:
   (a) an evaluation circuit that determines evaluation values for image signals, and signals;
   (b) a control circuit that controls an order according to which the image signals are output to the second signal processing circuit, based on the evaluation values; and
   (c) a selection circuit that selects an image signal for a single frame from among the image signals for a predetermined plural number of frames, based on the evaluation values,
   wherein the control circuit outputs the selected image signal via an external device to the second signal processing circuit and outputs the remaining image signals to the second signal processing circuit not via the external device,
   wherein the external device performs image processing on the selected image signal and then outputs the selected image signal to the second signal processing circuit, and
   wherein the second signal processing circuit does not perform image processing on the selected image signal output from the external device.

2. The image processing apparatus according to claim 1, wherein the evaluation value is a measure for evaluating the quality of an image indicated by the image signal from one or more perspectives of exposure, a focusing degree, and the state of a main subject, and
   the selection circuit selects an image signal that is determined as being the most favorable based on the evaluation values.

3. The image processing apparatus according to claim 1, wherein the second signal processing circuit preferentially outputs, to a recording circuit or a display circuit, an image signal that has been preferentially output from the first signal processing circuit.

4. An image processing apparatus comprising:
(A) a first signal processing circuit that receives image signals from an image sensor; and
(B) a second signal processing circuit that performs image processing on image signals output from the first signal processing circuit,
wherein the first signal processing circuit includes:
(a) an evaluation circuit that determines evaluation values for image signals;
(b) a control circuit that controls an order according to which the image signals are output to the second signal processing circuit, based on the evaluation values; and
(c) a selection circuit that selects an image signal for a single frame from among the image signals for a predetermined plural number of frames, based on the evaluation values,
wherein the control circuit controls the order according to which the image signals for the predetermined plural number of frames are output to the second signal processing circuit such that the selected image signal is preferentially output;
wherein the first signal processing circuit stores the image signals of the predetermined plural number of frames in a storage circuit, and outputs the image signals to the second signal processing circuit by reading out the image signals according to the order controlled by the control circuit, and
wherein a date rate at which the image signals are read out from the storage circuit is determined according to a processing data rate of the second signal processing circuit.

5. The image processing apparatus according to claim 4, wherein the evaluation value is a measure for evaluating the quality of an image indicated by the image signal from one or more perspectives of exposure, a focusing degree, and the state of a main subject, and
the selection circuit selects an image signal that is determined as being the most favorable based on the evaluation values.

6. The image processing apparatus according to claim 4, wherein the second signal processing circuit preferentially outputs, to a recording circuit or a display circuit, an image signal that has been preferentially output from the first signal processing circuit.

7. An image processing apparatus comprising:
(A) a first signal processing circuit that receives image signals from an image sensor; and
(B) a second signal processing circuit that performs image processing on image signals output from the first signal processing circuit,
wherein the first signal processing circuit includes:
(a) an encoding circuit that encodes image signals; and
(b) an evaluation circuit that determines evaluation values for image signals;
(c) a control circuit that controls an order according to which the image signals are output to the second signal processing circuit, based on the evaluation values; an encoding circuit that encodes image signals; and
(d) an encoding circuit that encodes image signals; and
(e) a selection circuit that selects an image signal for a single frame from among the image signals for a predetermined plural number of frames, based on the evaluation values,
wherein the encoding circuit does not encode the selected image signal or encodes the selected image signal so that degradation of the image quality to be less than when encoding the remaining image signals, and
wherein the control circuit controls the order according to which the image signals of the predetermined plural number of frames are output to the second signal processing circuit such that the selected image signal is preferentially output.

8. The image processing apparatus according to claim 7, wherein the second signal processing circuit further includes a decoding circuit that decodes image signals that have been encoded by the encoding circuit.

9. The image processing apparatus according to claim 7, wherein the evaluation value is a measure for evaluating the quality of an image indicated by the image signal from one or more perspectives of exposure, a focusing degree, and the state of a main subject, and
the selection circuit selects an image signal that is determined as being the most favorable based on the evaluation values.

10. The image processing apparatus according to claim 7, wherein the second signal processing circuit preferentially outputs, to a recording circuit or a display circuit, an image signal that has been preferentially output from the first signal processing circuit.

11. A method of controlling an image processing apparatus including a first signal processing circuit that receives image signals from an image sensor and a second signal processing circuit that performs image processing on image signals that have been output from the first signal processing circuit, the method comprising:
determining, by the first signal processing circuit, evaluation values for image signals;
controlling, by the first signal processing circuit, an order according to which the image signals are output to the second signal processing circuit, based on the evaluation values; and
selecting an image signal for a single frame from among the image signals for a predetermined plural number of frames, based on the evaluation values,
wherein the controlling outputs the selected image signal via an external device to the second signal processing circuit and outputs the remaining image signals to the second signal processing circuit not via the external device,
wherein the external device performs image processing on the selected image signal and then outputs the selected image signal to the second signal processing circuit, and
wherein the second signal processing circuit does not perform image processing on the selected image signal output from the external device.

12. A non-transitory medium storing instructions executable by one or more processors, wherein the instructions, when executed by the one or more processors, cause the one or more processors to function as an image processing apparatus that comprises:
(A) a first signal processing unit configured to receive image signals from an image sensor;
(B) a second signal processing unit configured to perform image processing on image signals output from the first signal processing means,
wherein the first signal processing unit includes:
(a) an evaluation unit configured to determine evaluation values for image signals; and (b) a control unit configured to control an order according to which the image signals are output to the second signal processing means, based on the evaluation values; and (c) a selection unit configured to select an image signal for a single frame from among the image signals for a predetermined plural number of frames, based on the evaluation values, wherein the control unit outputs the selected image signal via an external device to the second signal processing unit and outputs the remaining image signals to the second signal processing unit not via the external device, wherein the external device performs image processing ono the selected image signal and then outputs the selected image signal to the second signal processing unit, and wherein the second signal processing unit does not perform image processing on the selected image signal output from the external device.

13. A method of controlling an image processing apparatus including a first signal processing circuit that receives image signals from an image sensor and a second signal processing circuit that performs image processing on image signals that have been output from the first signal processing circuit, the method comprising:

determining, by the first signal processing circuit, an order according to which the image signals are output to the second signal processing circuit, based on the evaluation values; and selecting an image signal for a single frame from among the image signals for a predetermined plural number of frames, based on the evaluation values, wherein the controlling controls the order according to which the image signals for the predetermined plural number of frames are output to the second signal processing circuit such that the selected image signal is preferentially output, wherein the first signal processing circuit stores the image signals of the predetermined plural number of frames in a storage circuit, and outputs the image signals to the second signal processing circuit by reading out the image signals according to the order controlled by the controlling, and wherein a data rate at which the image signals are read out from the storage circuit is determined according to a processing data rate of the second signal processing circuit.

14. A non-transitory medium storing instructions executable by one or more processors, wherein the instructions, when executed by the one or more processors, cause the one or more processors to function as an image processing apparatus that comprises:

(A) a first signal processing unit configured to receive image signals from an image sensor; and (B) a second signal processing unit configured to perform image processing on image signals output from the first signal processing unit, wherein the first signal processing unit includes:

(a) an evaluation unit configured to determine evaluation values for image signals;

(b) a control unit configured to control an order according to which the image signals are output to the second signal processing means, based on the evaluation values; and (c) a selection unit configured to select an image signal for a single frame from among the image signals for a predetermined plural number of frames, based on the evaluation values, wherein the control unit controls the order according to which the image signals for the predetermined plural number of frames are output to the second signal processing circuit such that the selected image signal is preferentially output, wherein the first signal processing circuit stores the image signals of the predetermined plural number of frames in a storage circuit, and outputs the image signals to the second signal processing circuit by reading out the image signals according to the order controlled by the control unit, and wherein a data rate at which the image signals are read out from the storage circuit is determined according to a processing data rate of the second signal processing circuit.

* * * * *